US008734694B2

(12) United States Patent
Perret et al.

(10) Patent No.: US 8,734,694 B2
(45) Date of Patent: May 27, 2014

(54) METHOD FOR SUPPLYING A BUILDING MATERIAL

(75) Inventors: Hans Perret, Munich (DE); Thomas Halder, Munich (DE); Jochen Philippi, Gräfelfing (DE); Peter Keller, Krailling (DE); Gerd Cantzler, Neuried (DE); Michael Göth, Munich (DE); Siegfried Schimitzek, Munich (DE); Andrea Weichselbaumer, Pfaffenhofen (DE)

(73) Assignee: EOS GmbH Electro Optical Systems, Krailling (DE)

( * ) Notice: Subject to any disclaimer, the term of this patent is extended or adjusted under 35 U.S.C. 154(b) by 49 days.

(21) Appl. No.: 13/479,385

(22) Filed: May 24, 2012

(65) Prior Publication Data

US 2012/0267813 A1 Oct. 25, 2012

Related U.S. Application Data

(63) Continuation of application No. 11/986,462, filed on Nov. 21, 2007, now Pat. No. 8,186,990.

(30) Foreign Application Priority Data

Nov. 22, 2006 (DE) .................. 10 2006 055 074

(51) Int. Cl.
*B29C 67/00* (2006.01)
(52) U.S. Cl.
USPC ........ 264/109; 264/497; 425/174.4; 425/130; 222/145.1; 222/129; 222/162
(58) Field of Classification Search
None
See application file for complete search history.

(56) References Cited

U.S. PATENT DOCUMENTS

| 4,378,897 | A |  | 4/1983 | Kattelmann |
| 4,876,043 | A |  | 10/1989 | Hall, Sr. |
| 5,148,943 | A |  | 9/1992 | Moller |
| 5,301,844 | A | * | 4/1994 | Ricciardi ................. 222/199 |
| 5,647,931 | A |  | 7/1997 | Retallick et al. |
| 5,922,364 | A |  | 7/1999 | Young, Jr. |
| 6,030,199 | A |  | 2/2000 | Tseng |
| 6,057,514 | A |  | 5/2000 | Maguire |
| 6,111,206 | A |  | 8/2000 | Maguire |
| 6,554,600 | B1 |  | 4/2003 | Hiofmann et al. |
| 6,672,343 | B1 |  | 1/2004 | Perret et al. |
| 6,698,624 | B2 |  | 3/2004 | Ufheil et al. |
| 2001/0045678 | A1 |  | 11/2001 | Kubo et al. |
| 2002/0113080 | A1 |  | 8/2002 | Beal et al. |
| 2006/0145381 | A1 |  | 7/2006 | Larsson |
| 2007/0298182 | A1 |  | 12/2007 | Perret et al. |

FOREIGN PATENT DOCUMENTS

| DE | 101 58 169 A1 | 6/2003 |
| DE | 203 18 721 U1 | 5/2005 |
| DE | 102005016940 A1 | 10/2006 |
| EP | 1 700 686 A2 | 9/2006 |
| JP | 59-024305 U | 2/1984 |

(Continued)

*Primary Examiner* — Benjamin Schiffman
(74) *Attorney, Agent, or Firm* — Seyfarth Shaw LLP

(57) ABSTRACT

A device (1) for manufacturing a three-dimensional object by a layerwise solidification of a building material at positions in the respective layers that correspond to the object is provided. A feed (96) that supplies the building material to a building space (10) in the device (1) and at least two filler portions (98a, 98b) that are provided at the feed (96) and are independent from one another are provided, wherein one connector (99a, 99b) is provided for each building material supply container (100a, 100b) in order to supply the building material from outside of the device (1).

17 Claims, 15 Drawing Sheets

(56) References Cited

FOREIGN PATENT DOCUMENTS

| | | |
|---|---|---|
| JP | 63-135217 | 6/1988 |
| JP | 2006-509914 A | 3/2006 |
| RU | 2 082 607 C1 | 6/1997 |
| SU | 245 340 A1 | 6/1969 |
| WO | 00/21736 A1 | 4/2000 |
| WO | 2004/054743 A1 | 7/2004 |
| WO | 2006/121797 A2 | 11/2006 |

* cited by examiner

METHOD FOR SUPPLYING A BUILDING MATERIAL

CROSS REFERENCE TO RELATED APPLICATIONS

The present application is a continuation of U.S. patent application Ser. No. 11/986,462, now U.S. Pat. No. 8,186,990, filed Nov. 21, 2007, entitled "Device for Supplying Building Material in Layerwise Manufacturing of a Three-Dimensional Object," which claims priority to DE 10 2006 055 074.9, filed Nov. 22, 2006, the entire contents of which are incorporated herein by reference.

The present invention is related to a device for manufacturing a three-dimensional object by a layer wise solidification of a building material at positions in the respective layers that correspond to the object and to a method for supplying the building material to such a device.

There are devices known, in which a three-dimensional object is manufactured layer wise from a building material. Such a device is for example known from DE 2005 016 940 A1. In DE 10 2005 016 940 A1 a device for a layerwise manufacturing of a three-dimensional object is described, which comprises a laser sintering device. In the device a building material in powder form is processed. For the application of a layer of the material in powder form a device is provided that comprises a powder application device, a conveyor roller and a feeding chute.

In WO 00/21736 A1 a device, for manufacturing a three-dimensional object is described, which consists of a laser sintering device. A replaceable container is described, in which a work piece platform is integrated as bottom of the container. The replaceable container can be removed from the device, and a coupling device is provided in the device, which coupling device serves for mounting the container in the device and for connecting the work piece platform to a drive.

In the known devices before starting a building process in the device an amount of the building material that is sufficient for the building process has to be provided. An exchange of a building material supply container while the building process is on-going is not possible.

It is an object of the present invention to provide a device and a method, by which an improved feed of the building material to the device is established.

The object is achieved by a device according to claim 1 and by a method according to claim 12, respectively.

By providing two filler portions that are independent from one another and each are provided with a connector for a building material supply container a greater variability in the supply of the building material is achieved. At one connector an exchange or a replacement of a building material supply container can take place, while via the other connector still building material is supplied to the device. The building process does not need to be interrupted in order to supply further building material to the device.

Further features and advantages of the invention arise from the description of embodiments on the basis of the accompanying drawings, of which:

Figure 2:
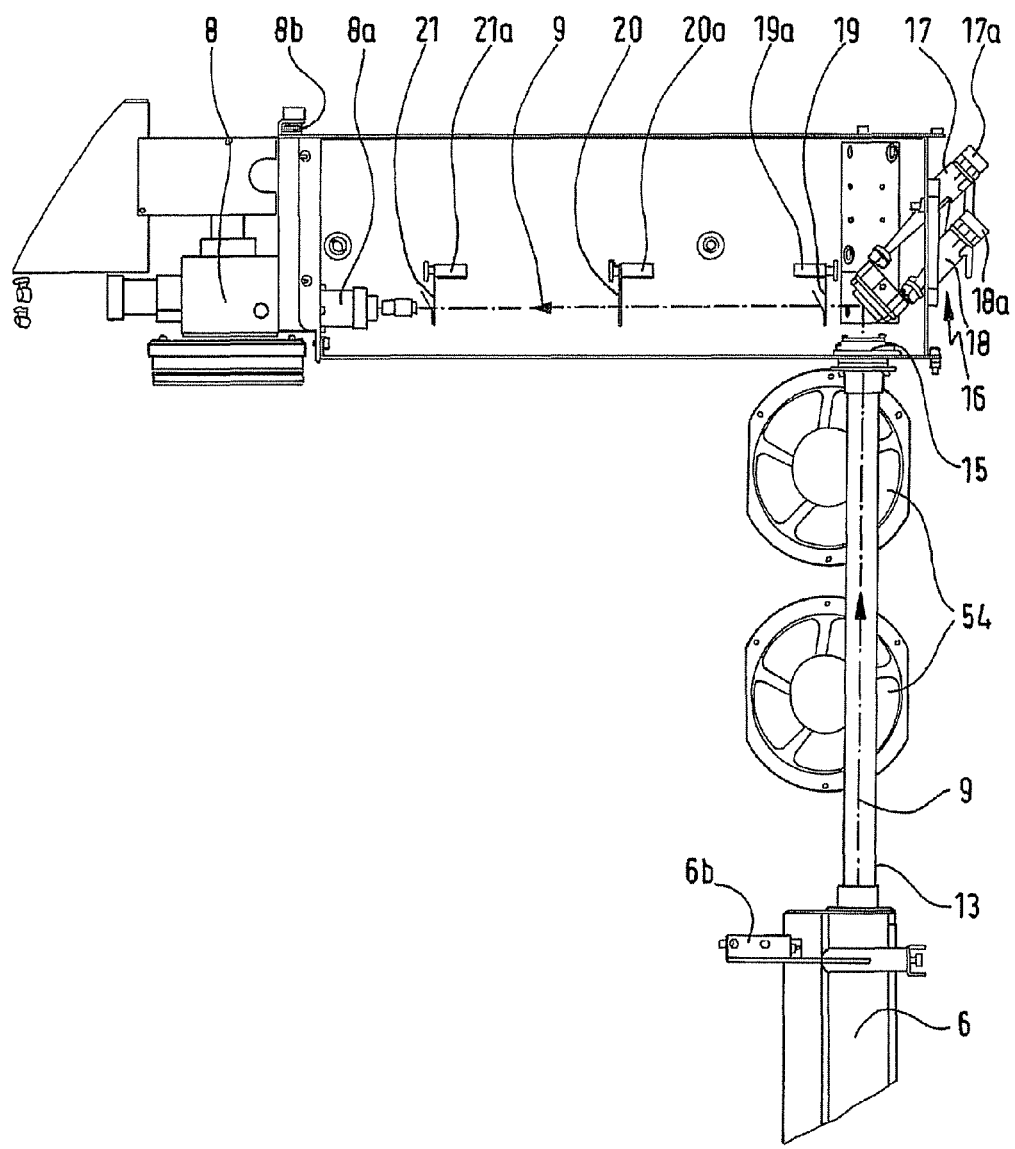
FIG. 2 shows a schematic representation of the beam guide in the embodiment according to FIG. 1.
Figure 3:
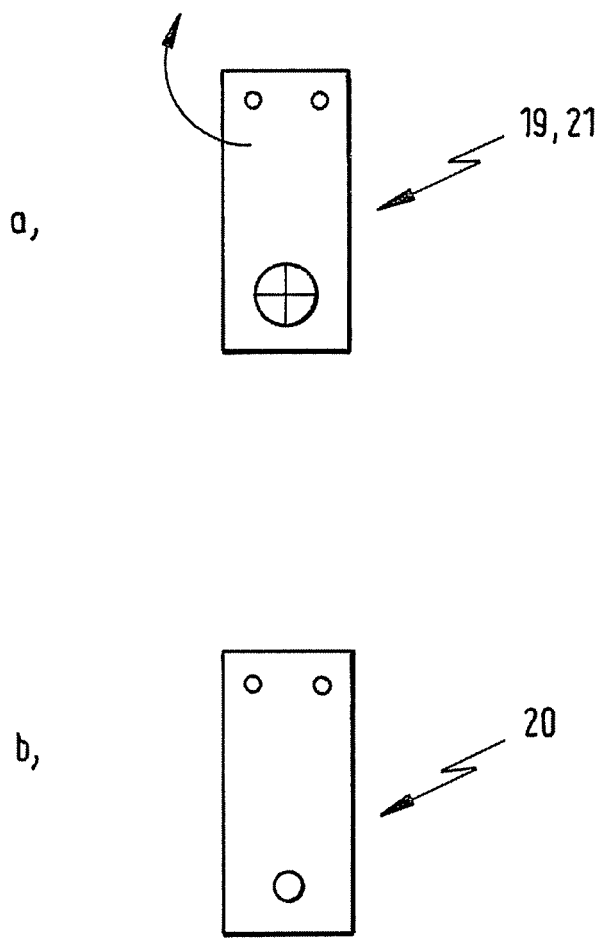
Figure 4:
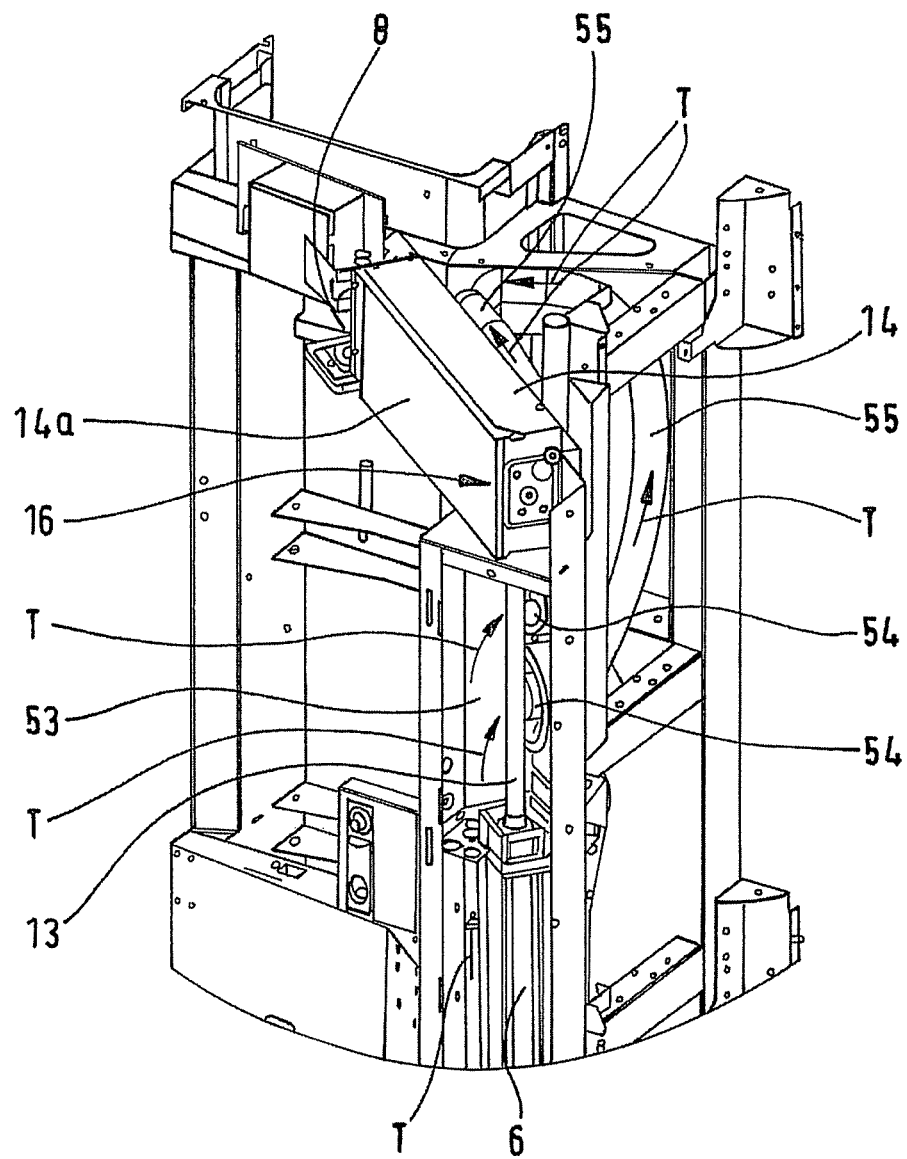
Figure 5:
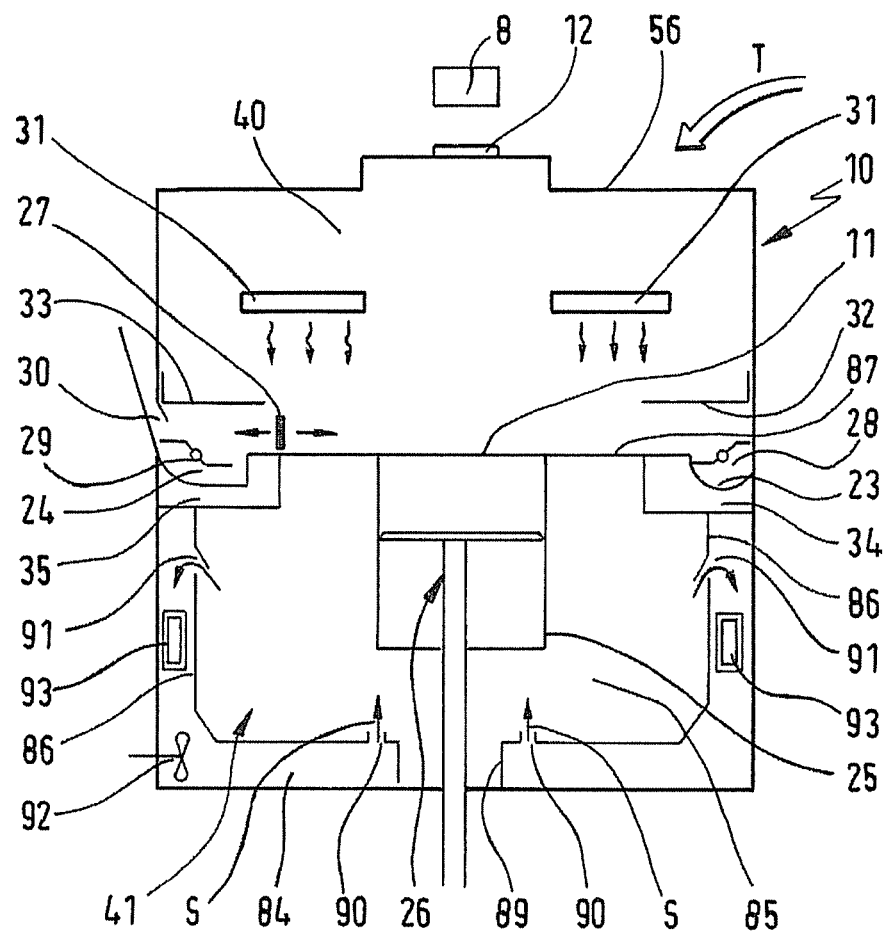
Figure 6:
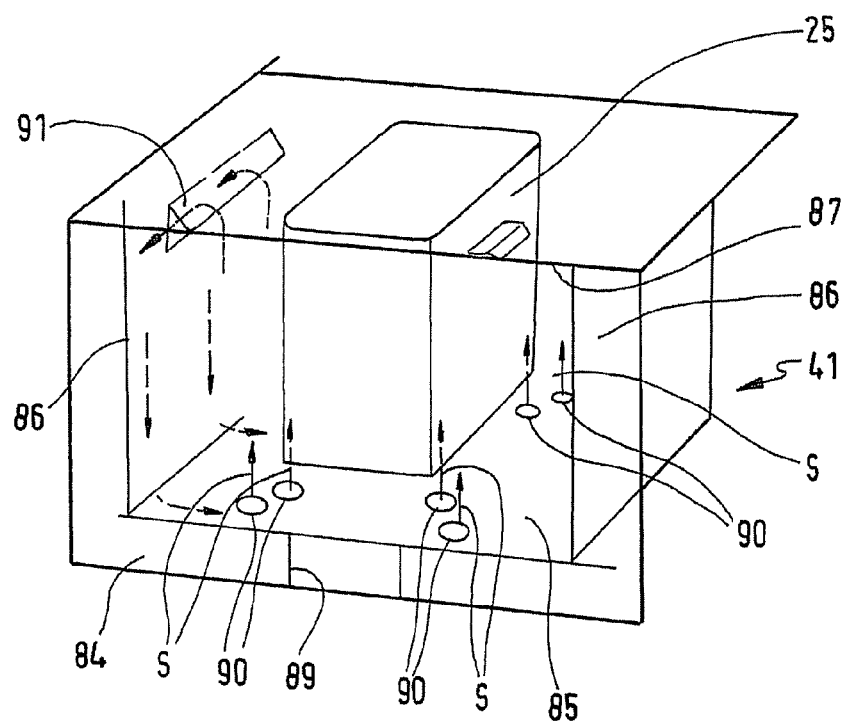
Figure 7:
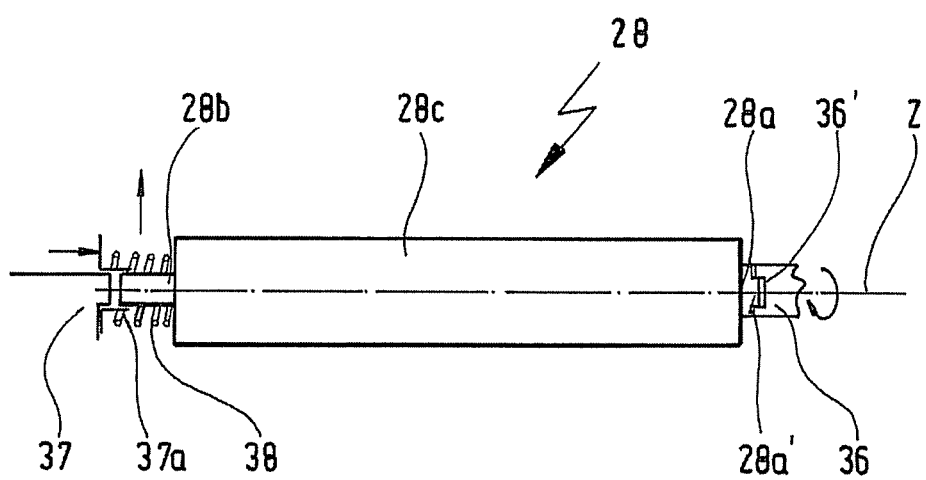
Figure 8:
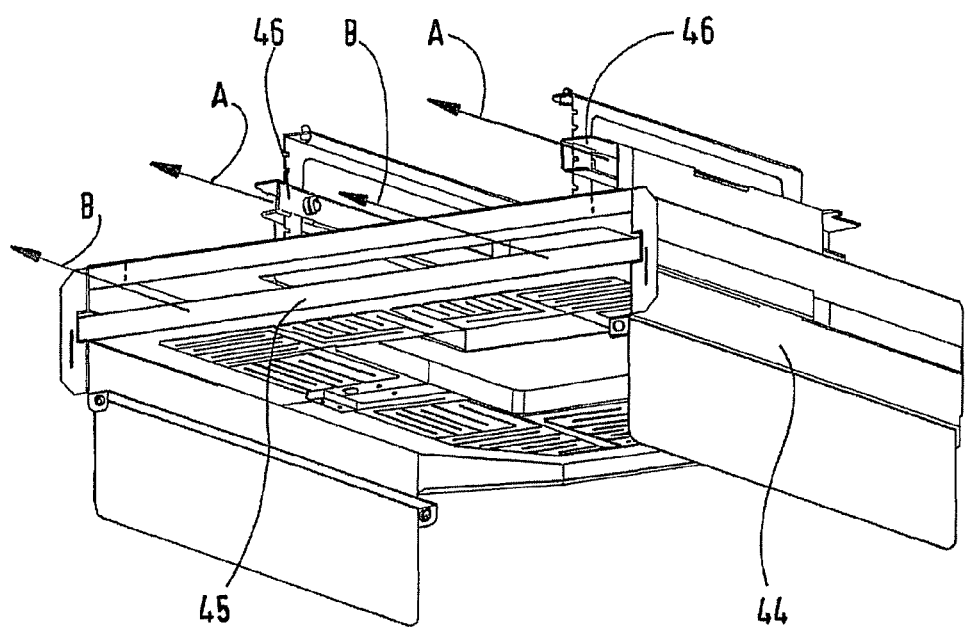
Figure 9:
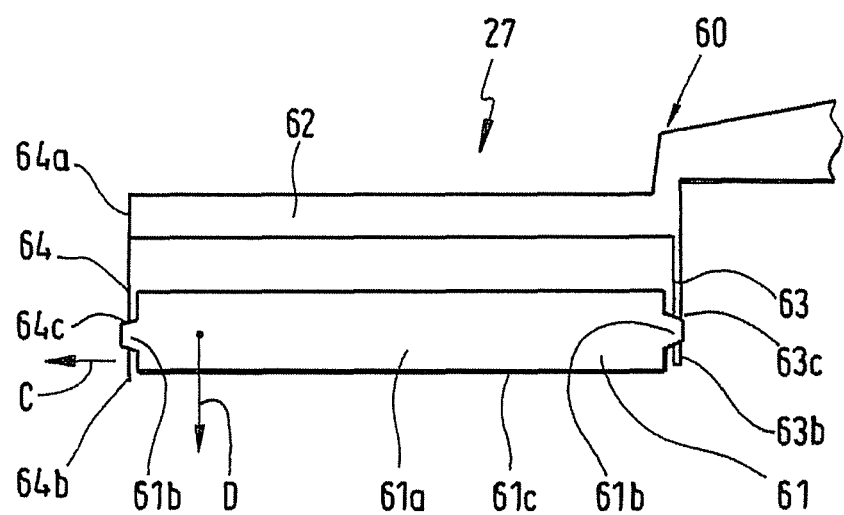
Figure 10:
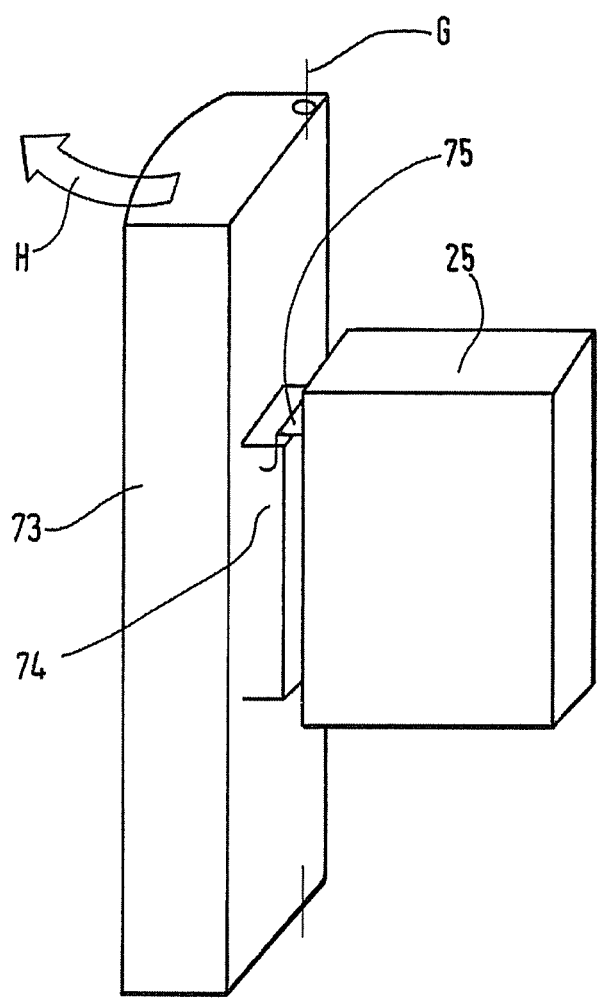
Figure 11:
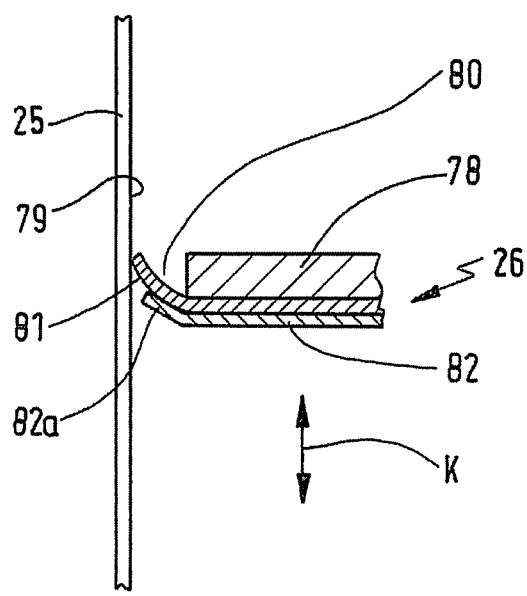
Figure 12:
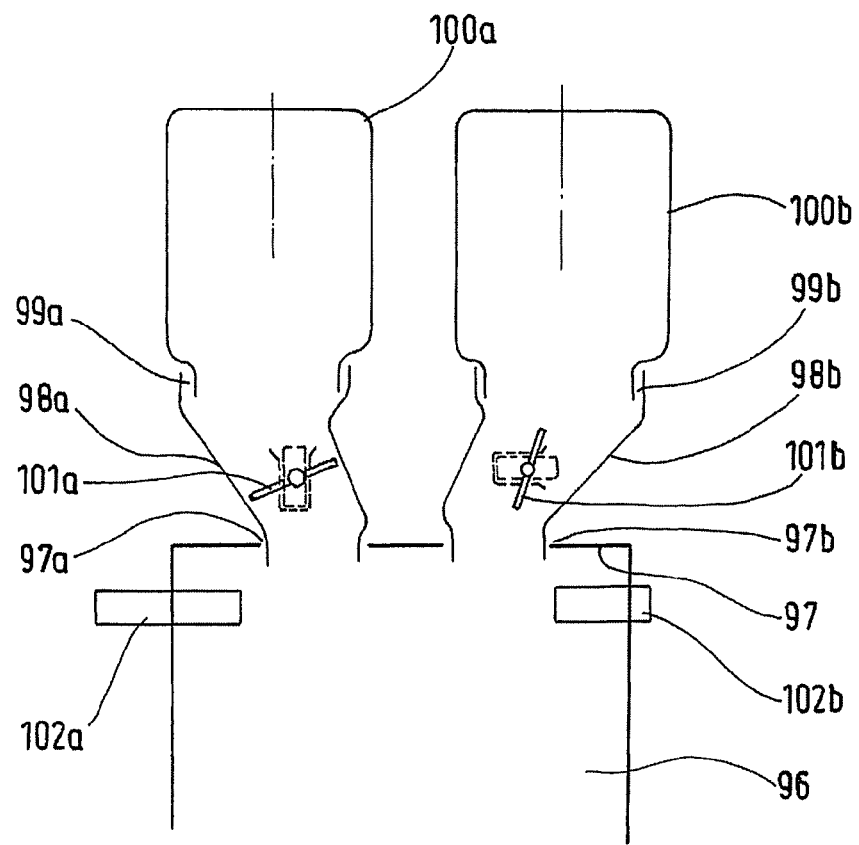
Figure 13:
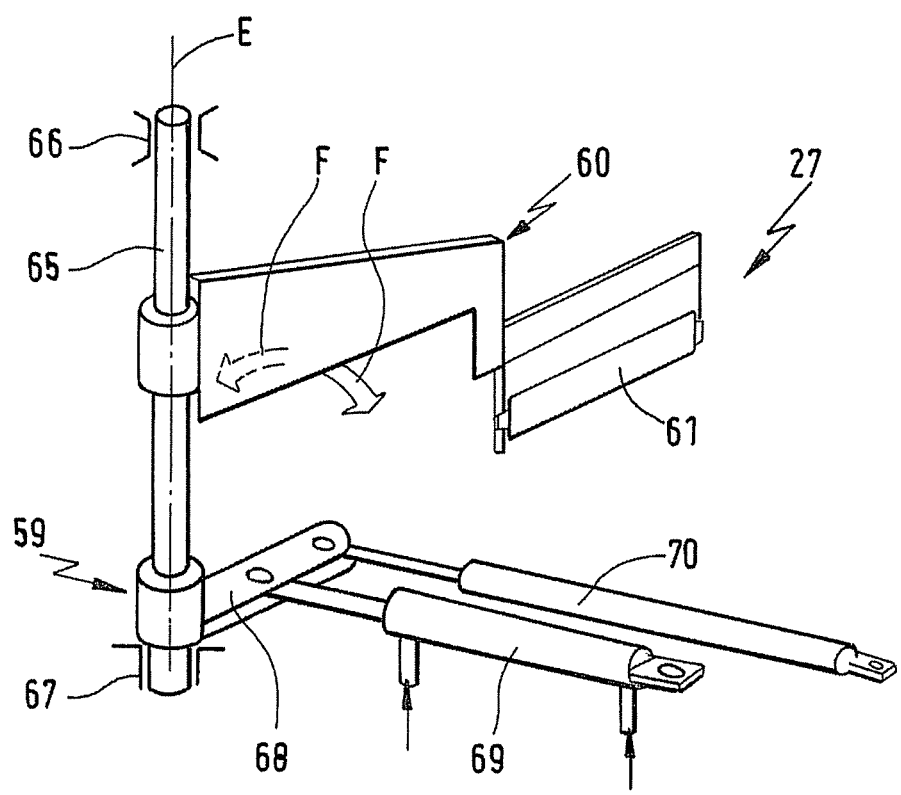
Figure 14:
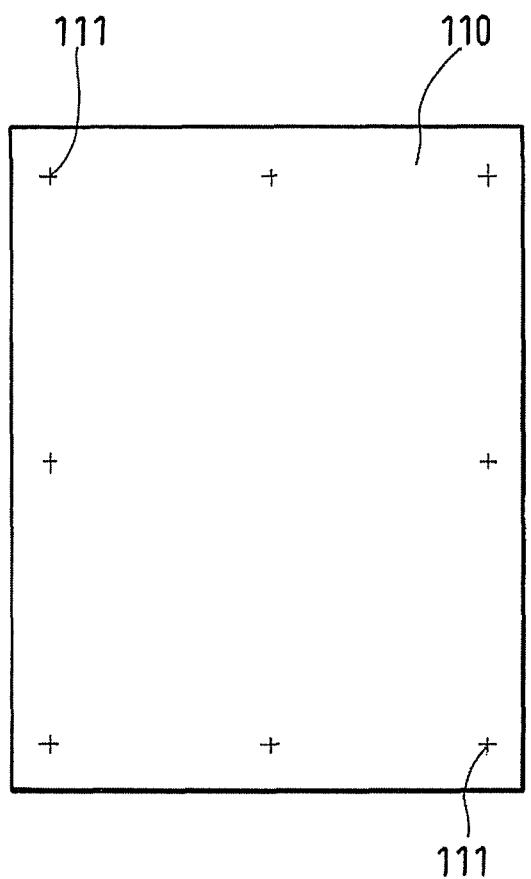
Figure 15:
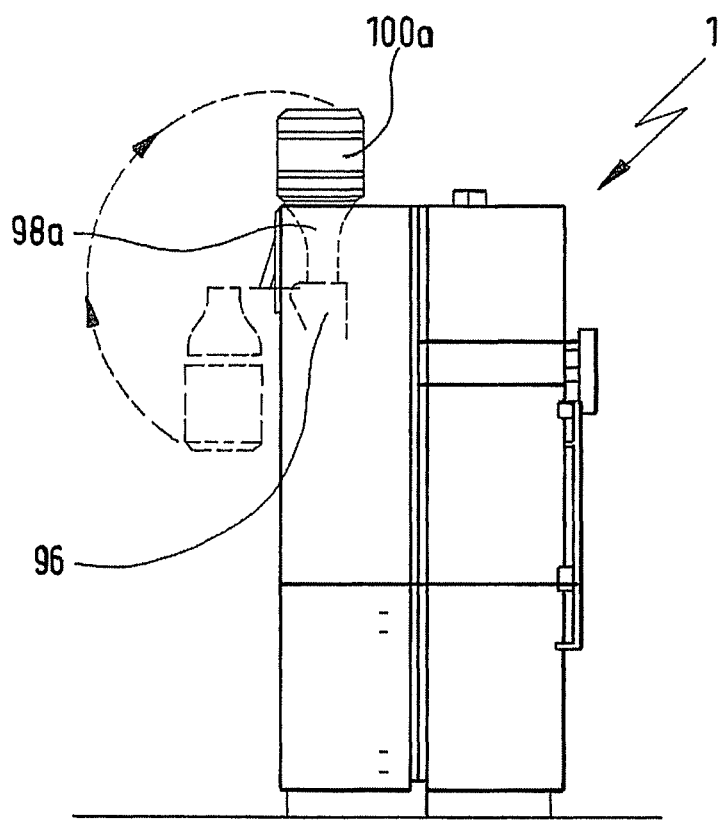

FIGS. 3*a* and 3*b* show schematic detailed representations of the apertures in FIG. 2;

FIG. 4 shows a schematic perspective representation of details of a ventilator system in the region of the beam guide in the embodiment;

FIG. 5 shows a schematic representation of the building space in the embodiment;

FIG. 6 shows a schematic representation of a building container ventilation system in the embodiment;

FIG. 7 shows a schematic representation of the mounting of a dosage device in the embodiment;

FIG. 8 shows a schematic representation of the mounting of a building space heating module in the embodiment;

FIG. 9 shows a schematic representation of the mounting of an application device in the embodiment;

FIG. 10 shows a schematic representation of a mounting of the building container;

FIG. 11 shows a schematic representation of a building platform seal in the embodiment;

FIG. 12 shows a schematic representation of a building material supply system in the embodiment;

FIG. 13 shows a schematic representation of an application system in the embodiment;

FIG. 14 shows a schematic view of a layer to be used in a beam adjustment method; and FIG. 15 shows a further schematic representation illustrating the building material supply system.

With respect to FIGS. 1 and 5 in the following the basic construction of a device for manufacturing a three-dimensional object by a layerwise solidification of a building material is described, which according to an embodiment is constructed as laser sintering device. In the device for a manufacturing of a three-dimensional object layers of a building material are subsequently applied on one another and the positions within each layer that are corresponding to the object to be manufactured in each layer are selectively solidified before the application of a subsequent layer. In the described embodiment a building material in powder form is used, which is solidified by the action of an energy beam on selected positions. In the described embodiment the building material in powder form is locally heated at the selected positions by means of a laser beam such that it is connected to nearby constituents of the building material by sintering or melting.

Figure 1:
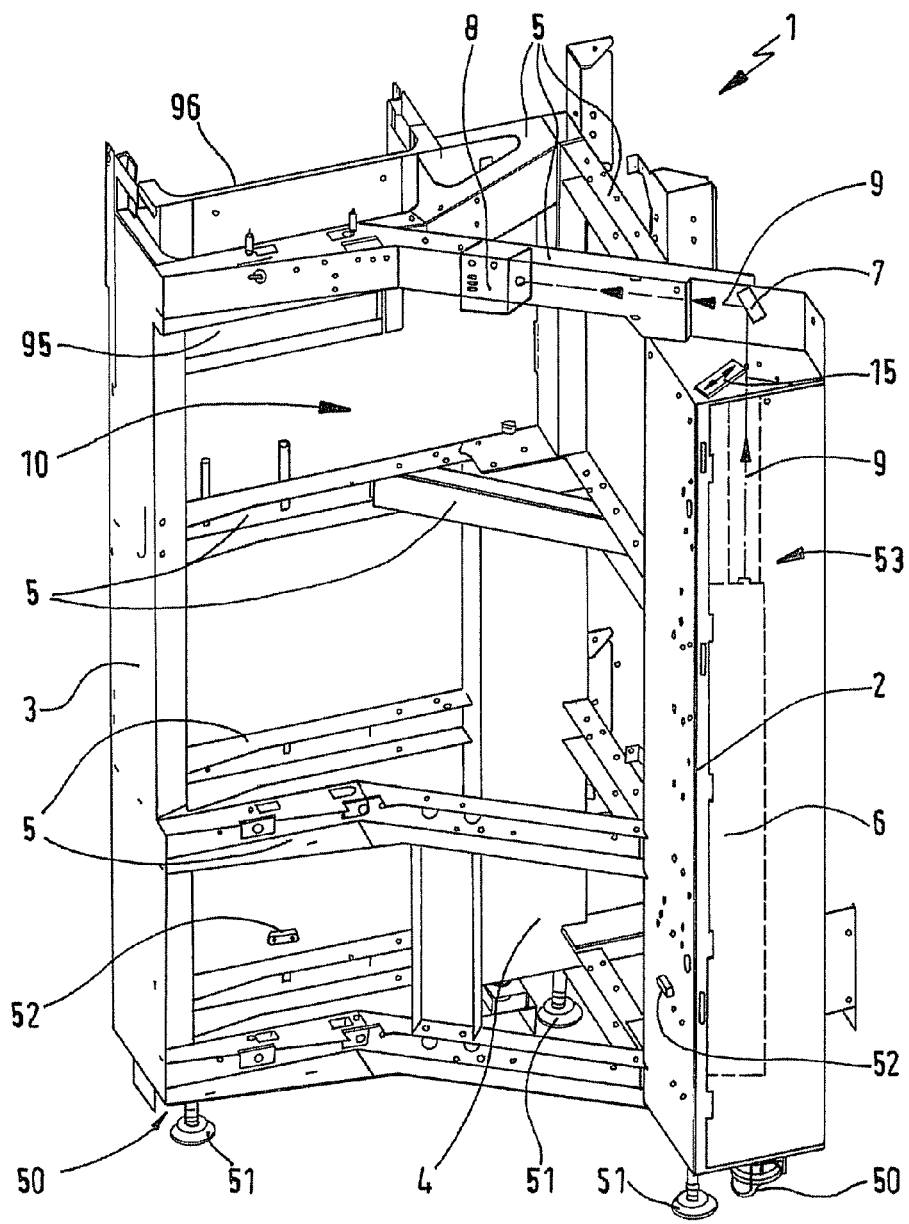
FIG. 1 shows a schematic representation of a frame system according to an embodiment.

As shown in FIG. 1 the laser sintering device comprises an optical system, wherein the components of the optical system are attached to the components of the machine frame. A building space 10, which is schematically represented in FIG. 5, is provided in the machine frame.

In the described embodiment the optical system comprises a laser 6, a deflection mirror 7 and a scanner 8. The laser 6 generates a beam 9 that is incident on the deflection mirror 7 and is deflected by the deflection mirror 7 towards the scanner 8. Alternatively, a different energy source such as a different radiation source that generates an energy beam, which is directed towards the scanner 8, may be used instead of the laser. The scanner 8 is constructed in a known manner, such that it can direct the incident beam 9 to arbitrary positions in a building plane 11 that is located in the building space 10 as shown in FIG. 5. In order to make this possible, an entrance window 12 is provided in an upper partition wall 56 of the building space 10 between the scanner 8 and the building space 10, wherein the entrance window 12 enables a passing of the beam 9 into the building space 10.

With respect to FIG. 5 in the following the building space of the device in the embodiment is described.

As can be seen in FIG. 5, in the building space 10 a container 25, which is open to the top, is provided. A support device 26 for supporting a three-dimensional object to be formed is arranged in the container 25. The support device 26 can be moved back and forth in the container 25 in a vertical direction by means of a drive that is not shown. The building plane 11 is defined in the region of the upper edge of the container 25. The entrance window 12 for the beam 9 that is directed onto the building plane 11 by means of the scanner 8 is arranged above the building plane 11. An application device 27 is provided for applying building material that is to be solidified onto the surface of the support device 26 or onto a layer that has previously been solidified. The application device 27 can be moved over the building plane 11 in a horizontal direction by means of the drive that is schematically indicated by the arrows in FIG. 5. On both sides of the building plane 11 dosage devices 28 and 29, respectively, are provided, which provide a predetermined amount of the building material for the application device 27 in order to be applied.

On the side of the dosage device 29 a supply opening 30 is provided. The supply opening 30 extends over the whole width of the building plane 11 in a direction that is perpendicular to the plane of FIG. 5. The supply opening serves for supplying building material to the building space, which in the shown embodiment is a powder material that can be solidified by means of radiation.

The building space in the embodiment is subdivided into an upper region 40 and a lower region 41, as is schematically shown in FIG. 5. The upper region 40 forms the actual work space, in which a layerwise application of the building material and its selective solidification are carried out. The lower region 41 accommodates the container 25.

In the shown embodiment some parts are formed by means of a method for a layerwise manufacturing of a three-dimensional element by selectively solidifying positions in the respective layers that correspond to the object. In the embodiment a laser sintering method is used for the manufacturing of the objects. With respect to conventional methods for manufacturing three-dimensional objects such as milling, turning, casting, etc., such a method particularly has an advantage, when complex geometries shall be generated and/or only relatively low quantities need to be manufactured.

Operation of the Device

When operating the device 1, the building material is supplied to the building space 10 via the supply opening 30, and a predetermined amount of the material is supplied to the application device 27 by means of the dosage devices 28, 29. The application device 27 applies a layer of the building material onto the support device 26 or a previously solidified layer and the beam 9 is directed to selected positions in the building plane 11 by means of the laser 6 and the scanner 8 in order to selectively solidify the building material in those positions that correspond to the three-dimensional object to be formed. Afterwards the support device is lowered by the thickness of one layer, a new layer is applied and the process is repeated until all layers of the object to be formed have been generated.

In the following several components of the device are described in more detail.

Frame Structure

At first the frame structure of the device of the shown embodiment is described based on FIG. 1. The device 1 comprises a machine frame, which is formed by three fundamental beams 2, 3 and 4, which are connected to each other by cross-bracings 5. The three fundamental beams 2, 3 and 4 are substantially vertical and form three corners of the device in the shown embodiment. In a plane view the device 1 thus substantially has the outline of a triangle. The fundamental beams 2, 3 and 4 and the cross-bracings 5 are arranged such that the outline substantially corresponds to the one of a right angle triangle, where the hypotenuse forms the front side of the device. The cross-bracings 5 are substantially horizontal and connect the fundamental beams such that a rigid, warp-resistant machine frame is formed, the components of which do not change their relative positions or only minimally change their relative positions, even when there is a unilateral action of forces.

Due to the design with three fundamental beams 2, 3 and 4 that are basically extending in a vertical direction and are arranged in the shape of a triangle, the device 1 can be supported at three positions on a substrate. Due to this construction having three legs the device can be arranged in a quick and uncomplicated way such that a jiggling or tilting with respect to the substrate is prevented. In particular, a change of the alignment with respect to the substrate may be achieved by changing the height of the support of one of the three support points, because this leads to a rotation around the line connecting the other two support points. With a four-point or multi-point support for a change of the alignment the height of at least two support points would have to be changed in order to achieve a stable support.

Each of the fundamental beams 2, 3 and 4 has a roller 50 and a height-adjustable support leg 51 arranged at its bottom side facing the ground. The support legs 51 are arranged on the corresponding fundamental beams 2, 3 or 4 such that they are adjustable in height. Each of the support legs 51 can be moved to a first position, in which the corresponding roller 50 has a larger distance to the bottom side of the respective fundamental beam than the bottom side of the support leg 51 has. Thus, in this first position the device 1 stands on the rollers 50 and the support legs 51 have a distance to the substrate. The rollers 50 are pivoted on the fundamental beams 2, 3 and 4, such that the device 1 can be moved over the substrate in arbitrary directions on the rollers 50. Also, each of the support legs 50 can be moved to a second position, in which the bottom side of the support leg 51 sticks out more from the bottom side of the respective fundamental beam 2, 3 or 4 than the respective roller 50. In this position, the device 1 is standing on the support legs 51 and a movement of the device 51 relative to the support can be reliably prevented.

In the shown embodiment for each of the support legs 51 the side that is facing the respective fundamental beam 2, 3 or 4 is designed as threaded rod having an external thread. Corresponding bores having an inside thread, into which the support legs 51 may be screwed, are provided in the bottom side of the respective fundamental beams 2, 3 and 4. Thus, by screwing a support leg 51 into the respective fundamental beam 2, 3 or 4 or unscrewing it, the distance of the bottom side of the support leg 51 from the fundamental beam can be continuously adjusted.

Two spirit levels 52 are mounted on the machine frame in two different positions. The spirit levels 52 are attached to the device 1 such that they are aligned in a stationary way. In the shown embodiment both spirit levels 52 are arranged in a plane, which is in parallel to the horizontal plane. In this plane, they have an angle of about 90° to one another. Both spirit levels indicate whether the device 1 is optimally aligned with respect to the horizontal plane. For an alignment of the device 1 the height of each of the three support legs 51 can be changed. The change of the alignment of the device 1 can be visually controlled by the spirit levels 52. The components inside of the device are pre-adjusted with respect to each other. As they are rigidly mounted in the frame system and because of the stiff frame construction of the device 1 their relative position is maintained. Thus, after an alignment of the device 1 all components, for which an exact spatial positioning with respect to each other is necessary for a proper function, are in the correct relative position. The spirit levels facilitate an upright positioning of the device. As a result a fast and efficient alignment of the device 1 after a transport or a change of its position is possible. The construction having three fundamental beams 2, 3, 4 and corresponding support legs 51 contributes to the fact that the device 1 can be aligned in few steps.

Optical System

Based on FIGS. 1, 2 and 4 in the following the optical system is described in more detail. The energy source, which is designed as laser 6, is arranged in one of the vertical fundamental beams 2 of the machine frame or parallel to such a fundamental beam and is adjustably connected with it, as can be seen in FIG. 1. The beam 9 that is emanated from the laser 6 is guided through a pipe 13. One end of the pipe 13 is connected to the casing of the laser 6 and the other end of the pipe is connected to a casing 14, which encloses the deflection mirror 7 and further components. Thus, the beam 9 runs from the laser 6 to the deflection mirror 7 in a vertical direction. The casing 14 comprises a sidewall 14a that can be removed from the casing 14, as can be seen in FIG. 4. FIG. 2 shows the casing 14 having the sidewall 14a removed.

As can be seen in FIGS. 2 and 4 an end of the casing 14 that is facing away from the pipe 13 is connected to an input side of the scanner 8 and the casing 14 is fixedly connected to the components of the machine frame. Thus, the pipe 13 and the casing 14 are arranged such that the beam 9 from the laser 6 runs to the scanner 8 inside of the pipe 13 and the casing 14 in a space that is secluded from the outside. A shutter 15, which is only schematically shown in the figures, is provided at the joint between the pipe 13 and the casing 14. The shutter 15 is designed such that the optical path of the beam 9 from the laser 6 to the deflection mirror 7 is interrupted, when the sidewall 14a is removed from the casing 14. By this construction it is guaranteed that no injury to an operator occurs inadvertently due to inattention, when the energy source operates and the sidewall 14a is removed. In the embodiment the shutter 15 is implemented by a mechanical slide, which blocks a beam passage from the pipe 13 to the casing 14, when the sidewall 14a is removed.

As can be seen in FIGS. 1 and 2, the deflection mirror 7 deflects the beam 9 to an entrance region 8a of the scanner. The deflection mirror 7 is suspended such that its alignment can be adjusted and it is provided with an adjustment mechanism 16 for adjusting its alignment. The adjustment mechanism 16 includes two actuators 17 and 18, each of which is arranged such that a drive 17a and 18a, respectively, of the actuators 17 and 18 is located outside of the casing 14. Thus, the drives 17a and 18a can be accessed from the outside when the casing 14 is closed and the alignment of the deflection mirror 7 can be changed, when the casing 14 is closed. In the shown embodiment each of the actuators 17 and 18 is designed as mechanical set screw, which has a scale in the region of the drives 17a and 18a, which scale corresponds to the alignment of the deflection mirror. The drives 17a and 18a are designed as adjusting knobs. In the shown embodiment the actuators 17 and 18 are manufactured by a laser sintering method. The adjusting knobs are lockable in order to prevent an inadvertent adjustment.

For an optimal functioning of the device an exact adjustment of the alignment of the beam 9 to the entrance region 8a of the scanner is necessary. To this end apertures 19, 20, 21, which are integrated in the casing 14 and may be brought into the optical path, are provided. In the shown embodiment three apertures 19, 20, 21 are provided in the casing. However, also a higher or a lower number of them may be provided. In the embodiment the aperture 19 close to the deflection mirror 7 and the aperture 21 close to the entrance region 8a of the scanner 8 both are designed as apertures having a reticle as shown in FIG. 3a. Further, the aperture 20, which is arranged therebetween, is designed as pinhole, as shown in FIG. 3b. For varying adjustment requirements there are also other designs of the apertures possible. Moreover, also several sets of apertures may be provided, which may be replaced depending on the requirement for a necessary adjustment. Depending on the energy source that is used for the beam 9, instead of the mechanical apertures also other elements may be provided, which are known to the skilled person and which are able to detect the position of the beam such as optical sensors for the detection of the position of the beam.

Each of the apertures 19, 20, 21 is swivel-mounted on its retainer 19a, 20a and 21a, respectively, that is mounted at the casing 14. In a first setting they are brought into the optical path and fixed. In a second setting they are removed from the optical path and fixed. The suspension of the apertures can e.g. be implemented by means of an axis, around which the apertures 19, 20 and 21 are rotatable in a direction which is perpendicular to the optical path. The fixing of the apertures 19, 20, 21 in their respective settings can, for example, be done by means of a knurled head screw, which is screwed onto this axis. However, many different ways of suspension are possible that are obvious to the skilled person due to his expert knowledge. For instance, a mechanism is possible, in which the apertures can be engaged in both positions.

As is merely schematically shown in FIG. 1, the scanner 8 is also attached to another component of the machine frame. In the shown embodiment the scanner 8 is mounted to a cross bracing 5. In the embodiment the scanner 8 is suspended such that an adjustment of the alignment of the scanner is possible by rotating it around an axis that is parallel to the optical path from the deflection mirror 7 to the entrance region 8a of the scanner. For this adjustment an adjustment mechanism 8b is provided. This makes an easy and quick fine adjustment of the alignment of the scanner 8 possible.

The beam 9 from the laser 6 to the scanner 8 is deflected only once. It is deflected via the deflection mirror 7, wherein the alignment of the deflection mirror 7 can be adjusted, when the casing 14 is closed. This leads to an optical path that can easily be adjusted by adjusting the position of few components. Thus, in the shown embodiment only an adjustment of the position of the laser 6, of the deflection mirror 7 and of the scanner 8 is necessary. The position of the laser 6 can be adjusted via an adjustment mechanism 6b. Each one of the laser 6, the deflection mirror 7 and the scanner 8 is directly fixed at the components of the rigid frame system. Therefore, in the event of a transport or a change of location of the device 1, the laser 6, the deflection mirror 7 and the scanner 8 do not change their relative positions to each other or do only slightly change their relative positions. Accordingly, a fine adjustment can be done within a short time and thus in an efficient way.

For an adjustment of the optical path each one of the apertures 19, 20 and 21 can be brought into the beam path individually or in combination with the other apertures. This additionally improves the possibility of adjusting the optical path in a quick and efficient way. Thus, it is possible to save costs when commissioning and servicing the device 1, because there is less effort necessary for an adjustment.

Method for Adjusting the Beam

Possible methods for adjusting the beam path are described.

In one method one of the two reticle apertures 19 and 21 is brought into the optical path and an illumination paper is inserted immediately behind the reticle. Then, the illumination paper is illuminated with a laser pulse and the shadow image of the reticle is evaluated. The centre of the beam cross-section should be exactly coincident with the centre of the cross. The beam path is readjusted by adjusting the alignment of the deflection mirror 7 via the actuators 17 and 18 and by adjusting the position of the laser 6. This method is suitable also in a case, in which the beam path initially deviates very much from the desired path. When using this method it is also possible to additionally insert the pin hole 20 into the beam path.

In a method for readjusting the optical system the aperture 20, which is designed as pin hole, is inserted into the optical path and afterwards the casing 14 is closed. A power measuring device, which measures the total power of the beam 9, is positioned in the building plane 11. The scanner 8 is driven in such a way that the beam 9 for the case of an exact adjustment would be optimally directed to the power measuring device. The beam power, which is measured by the power measuring device, is monitored and the alignment of the deflection mirror 7 is varied by operating the actuators 17 and 18. The alignment of the deflection mirror 7 is varied until the power measuring device measures the maximum beam power. In such position the beam 9 is optimally directed to the entrance region 8a of the scanner 8 by the deflection mirror 7. This method can also be performed without any pin hole, so that the entrance opening at the scanner 8 takes over the function of an aperture.

This way of adjustment makes possible a simple and quick adjustment of the beam path in a case, in which only a small mutual change of the positions of the components of the optical system has occurred and merely a fine adjustment is necessary. By the method an adjustment can be carried out within a short time and the costs of the adjustment in a commissioning and in a service can be reduced. Depending on the adjustment requirement it is also possible to perform this method without an initial insertion of the pin hole 20 into the optical path. In this case there is a further saving of time and the labor costs are reduced.

In a further method a layer 110 of a material that is sensitive for an irradiation with the beam 9, e.g. a paper that changes color by a temperature effect, is positioned in a defined region in the building plane 11. At few selected positions at the edge of the construction field, which is to be irradiated by the laser 9 in a manufacturing process, the layer 110 is provided with marks 111, as shown in FIG. 14. Afterwards those positions, which for a correct adjustment would correspond to the marks 111, are exposed to the beam 9 via the scanner 8. Then the deviations of the exposed positions from the marks 111 on the layer 110 in two directions are determined. In its simplest way the measurement can be performed for example by a ruler. On the basis of the measured boundary points it is then determined, whether with respect to the optical adjustment for example magnification errors or a tilting occurred. The errors that occurred can be determined for example by feeding the measured values into a corresponding evaluation program.

Magnification errors may e.g. result from mechanical distance variations between the scanner 8 and the construction field in the building plane 11 or from an electronic drift of the electronic components of the scanner 8. Tilting errors may e.g. result from mechanical distance and angle variations, respectively. Magnification errors and/or tilting errors that have been found, depending on the error that has been found, may be compensated by the above-described fine adjustment such as a readjustment of the horizontal alignment of the scanner 8, or by calculating correction parameters, which are used for correcting the aiming points of the laser 9 by programming in a control program for driving the scanner 8.

In the method only individual measurement points at the edge of the construction field are measured. For points of the construction field between the measurement points a determination of the error is done by interpolation. The error correction for points between the measurement points is also done by interpolation. Thus, only few measurement points have to be recorded, which may be done in a short time and with a small effort. Accordingly, the labor time incurred for adjustment and service work can be considerably reduced and therefore also the operating costs incurred can be lowered.

Laser And Optics Cooling

With respect to FIGS. 1, 2 and 4 in the following a ventilation system for the optical system is described.

Inside of the fundamental beam 2 there is a hollow space 53, in which the laser 6 and the pipe 13 are located. Two ventilators 54 are provided. The ventilators 54 generate an airflow T that leads away warm air from the laser 6 and therefore cools it. In the embodiment the ventilator 54 is provided in the region of the pipe 13 in the hollow space 53. The hollow space 53 is connected via two tubes 55 to the region of the device 1 above the building space 10, in which building space 10 the scanner 8, the deflection mirror 7 and the apertures 19, 20, 21 are provided.

As can be seen in FIG. 5, the airflow T is directed by the ventilator 54 to the upper partition wall 56 of the building space 10. Thus, the airflow for cooling the energy source is also deflected towards the optical system.

The cooling system for cooling the energy source designed as laser 6 thus is used in the embodiment at the same for cooling the optical system, which comprises the scanner 8, the deflection mirror 7 and the apertures 19, 20 and 21. Therefore, it becomes possible to cool all components of the optical system with one ventilation system.

As the airflow T is also led onto the upper partition wall 56 of the building space 10, the same ventilation system can also serve for a cooling of the upper side of the building space 10 and a too strong heating of control components of the device 1, which are located above the building space 10, can be prevented. The cooling of the upper side of the building space 10 is done by means of the ventilation system of the optical system. Therefore, no separate cooling needs to be provided, because the cooling system of the laser can be also used for leading process heat from the building process to the outside of the device 1. Thus, costs can be saved and the device can be built in a compact way.

In this embodiment the hollow space 53, in which the laser 6 is located, is connected to the upper side of the building space or construction space 10 by means of two tubes. However, it is e.g. also possible to implement a connection via flow channels in the machine frame itself. It is also possible to merely provide one tube or one connection channel. Though two ventilators 54 are described, depending on the necessary cooling capacity, also merely one ventilator or a plurality of ventilators 54 may be provided. The arrangement of a common ventilation system for the optical system and for the upper side of the building space 10 is not limited to a construction, in which the energy source is a laser or in which the energy source is located in the fundamental beam 2. The effect of an efficient and cost-effective cooling of the optical system and of the upper side of the building space is also achieved when using other arrangements. However, the arrangement of the energy source in a fundamental beam of the frame enables a space-saving implementation.

In the following individual components of the device 1 in the building space 10 are described.

Heating Device

A heating device 31 for heating the powder bed in the container 25 and in particular for pre-heating a layer that has been applied but not yet solidified is arranged in the building space 10 above the building plane 11, as is shown in FIG. 5. The heating device is designed for example as one radiant heater or a plurality of radiant heaters such as (an) infrared radiator(s), which is/are arranged above the building plane 11 such that the applied layer of the building material can be uniformly heated. In the shown embodiment the heating device 31 is designed as a two-dimensional radiator having a heat radiating element that is composed of a graphite plate. As can be seen in FIG. 8, the heat radiating element has a meandering structure.

In the shown embodiment the heating device 31 being a substantially square plate having a substantially square cut at its centre below the entrance window 12 extends around the area, through which the beam 9 from the scanner 8 to the building plane 11 passes.

The mounting of the heating device 31 is described with respect to FIG. 8. As is shown in FIG. 8, the heating device 31 in the embodiment consists basically of a fixture 44 and of the radiant heater 45. The fixture 44 is received in a support 46 that is arranged in the upper region 40 of the building space 10. The radiant heater 45 is received in the fixture 44.

As is schematically shown in FIG. 8 by the arrows A, the fixture 44 can be removed together with the radiant heater 45 from the support 46. The support 46 is designed as a rail, into which the fixture 44 is inserted. The fixture 44 can be inserted into the support 46 and removed from it without a tool. Several designs are possible for the connection between the fixture 44 and the support 46. An attachment may be effected for example via springs, clamps or the like. There may be provided structures, wherein the fixture 44 is engaged in the support 46.

The fixture 44 also has a rail-like structure, into which the radiant heater 45 is inserted. The radiant heater 45 can be introduced into the fixture 44 and can be removed from the fixture 44 without a tool. Again, as it was the case for the connection between the fixture 44 and the support 46, different kinds of connection between the fixture 44 and the radiant heater 45 are possible. An engagement of the radiant heater 45 in the fixture 44 may be provided.

Thus, the described design of the support 46, the fixture 44 and the radiant heater 45 on the one hand makes possible to remove the fixture 44 from the radiant heater 45 without the use of a tool. This is particularly advantageous for cleaning the building space 10. On the other hand the radiant heater 45 can be removed from the fixture 44 without using a tool. This is particularly advantageous for the service and the replacement of the radiant heater 45. The removal or replacement without tools of components of the heating device 31 enables a quick and uncomplicated cleaning of the device 1 and a quick and uncomplicated replacement of the radiant heater 45. Thereby, time can be saved during service and cleaning work and the device 1 will be again available for the next working process within a shorter time.

Dosage Device

As is schematically shown in FIG. 5, in the shown embodiment each of the dosage devices 28 and 29 is formed in the shape of angulated plates, which extend over the whole width of the building plane 11 in a direction, which is perpendicular to the plane of FIG. 5. The dosage devices 28 and 29 can be rotated like a roll around an axis that is running in parallel to the building plane 11, and each of the dosage devices 28 and 29 represents a conveyor roller. The dosage devices 28, 29 are formed in such a way that by the movement of the application device 27 they are driven such that they rotate by a defined angle around their axis.

The dosage device 28 is schematically shown in FIG. 7. The dosage device 29 is similar to the dosage device 28 and is not described in detail. The dosage device 28 can be removed from the device 1 and can be re-inserted without a tool. As is shown in FIG. 7, the dosage device 28 comprises a central portion 28c that is formed in the shape of an angulated plate and extends along the axis of rotation Z. The central portion 28c serves for dosing a defined amount of a building material. Further, the dosage device 28 comprises a first end 28a, which in the direction perpendicular to the axis of the rotation Z has a smaller cross-section than the central portion 28c. A second end 28b of the dosage device 28 also has a smaller cross-section than the central portion 28c in the direction perpendicular to the axis of rotation Z. The first end 28a of the dosage device 28 is connected to a suspension 36 around which the dosage device rotates or together with which the dosage device 28 rotates around the axis of rotation Z. For that purpose the first end 28a and the suspension 36 are connected with each other in a positive or form-locking way. In the shown embodiment the first end 28a has e.g. a cylindrical protrusion 28a', which is positively inserted into a recess 36', which is also cylindrical, in the suspension 36. However, the suspension 36 and the first end 28 can be designed in a different way. For instance the first end 28a may have a recess and the suspension may have a protrusion. The recess and the corresponding protrusion may e.g. also have any other shape that leads to a form-locking connection.

The second end 28b of the dosage device 28 is connected to a bearing 37. The second end 28b is pivot-mounted by the bearing 17. In the shown embodiment the bearing 37 has an annularly protruding edge 37a that is concentrical to the axis of rotation Z. The second end 28b is designed as cylinder-shaped protrusion, which is inserted into the recess that is formed by the annularly protruding edge 37a. However, also other designs of the bearing 37 and the second end 28b are possible. The bearing 37 can e.g. be designed as protruding pivot and the second end 28b may have a recess that is engaged by the pivot. For enabling a pivoting of the dosage device 28 several implementations are possible.

Moreover, in the shown embodiment a preload element 38 is provided on the side of the second end 28b between the dosage device 28 and the bearing 37, wherein the preload element 38 preloads the dosage device 28 towards the suspension 36. In the embodiment the preload element 38 is formed by a helical spring that is provided coaxially to the axis of rotation Z on or around the edge 37a and the second end 28b. However, alternative embodiments are also possible. For instance, the preload element can be designed in the shape of a leaf spring, the preload element can be provided in the bearing 37 or in the second end 28b and the second end 28b itself can be moveably mounted on the dosage device 28 by the preload element.

In the shown embodiment the distance between the bearing 37 and the suspension 36 is larger than the length of the dosage device between the first end 28a and the second end 28b by a predetermined distance. The predetermined distance is slightly larger than the length of the protrusion 28a' in the direction of the axis of rotation Z. Due to this design the dosage device 28 can be moved against the preloading force of the preload element 38 into the direction of the bearing 37, so that the form-locking engagement between the first end 28a and the suspension 36 can be released. Then the dosage device 28 can be taken out and can e.g. be cleaned or be replaced by another dosage device. The insertion of the dosage device 28 takes place by using the reversed sequence of method steps.

Thus, the described embodiment makes it possible to remove the dosage device 28 without the use of a tool. The removal and the replacement of the dosage device 28 without a tool enable a quick and uncomplicated cleaning of the device 1 and a quick and uncomplicated replacement of the dosage device 28. Thereby time can be saved during service and cleaning work and the device is again available for the next production process within less time and the operating costs of the device 1 can be lowered.

Alternatively, e.g. the bearing 37 and/or the suspension 36 may be configured as a drive shaft, which drives the dosage device such that it rotates. In such a case a form-locking connection can also be used between the second end 28b and the bearing.

The receptacles on both sides of the dosage device 28, in which the latter is mounted, can for example be designed as recesses, into which the dosages device 28 is laterally inserted. A fixing can for example be achieved by the using of springs, clamps and the like. There may be provided structures, in which the dosage device 28 engages in its mounting. The dosage device 28 can e.g. also be fixed by means of a knurled head screw that may be tightened and released by hand.

Building Material Supply/Thermal Protection

With respect to FIG. 5 the region of the dosage devices 28 and 29 in the building space 10 is described.

In the region of the dosage device 29 a building material accommodation region 23 is formed, which is extending beneath a plane, within which the building plane 11 is located. The building material accommodation region 23 is formed such that it can accommodate a limited amount of building material that is supplied by the application device 27. In the region of the dosage device 29 and the supply opening 30 a building material accommodation region 24 is formed. The building material accommodation region 24 is dimensioned such that it can accommodate the building material, which is supplied via the supply opening 30, and also the building material that is returned by the application device 27.

The dimensions of the building material accommodation regions 23 and 24 and of the dosage devices 28 and 29 are matched to each other such that by each turn of the dosage device 28 or 29 by 180° a defined amount of the building material is moved in front of the application device 27.

As is shown in FIG. 5, above the dosage devices 28 and 29 radiation protection shields 32 and 33, respectively, are mounted. The radiation protection shields 32 and 33 prevent a heat radiation from the heating device 31 from directly acting on the building material that is located in the region of the dosage devices 28 and 29 and in the region of the supply opening 30 and in the building material accommodation regions 23 and 24.

The lower side of the building material accommodation regions 23 and 24 is provided with a double wall structure, by which hollow spaces 34 and 35 are formed. The hollow spaces extend across the whole lower side of the building material accommodation regions 23 and 24. By this double wall structure the building material accommodation regions are bottom-insulated with respect to the components of the device 1 located beneath them. According to one embodiment a fluid can be circulated through the hollow spaces 34 and 35 in order to adjust the temperature of the building material in the building material accommodation regions 23 and 24. Also, a control device may be provided that controls the flow rate of the fluid through the hollow spaces 34 and 35 and/or the temperature of the fluid. By providing such a control device the temperature of the building material can be controlled.

By providing the radiation protection shields 32 and 33 and the hollow spaces 34 and 35 the temperature of the building material in the area of the dosage devices 28 and 29 and the powder accommodation regions 23 and 24 can be kept at a lower value than the temperature of the building space above the building plane 11 and the temperature of the region below the container 25.

Thus, by providing the hollow spaces 34 and 35 and the radiation protection shields 32 and 33 a too high rise of the temperature of the building material in the building material accommodation regions 23, 24, which is not desired, is prevented. Thereby the danger of thermally affecting the properties of the building material before the building process, which is undesirable, may be reduced.

Application System

In the following the application system in the embodiment is described with respect to FIGS. 9 and 13.

As can be seen in FIG. 13, the application system comprises the application device 27 and a drive mechanism 59. The application device 27 comprises the application element 61 and a holder 60. The application element 61 is held in the holder 60. The holder 60 is connected to the drive mechanism 59.

As can be seen in FIG. 9 the holder 60 comprises a main arm 62 and two holder arms, a first holder arm 63 and a second holder arm 64, which are vertically extending from the main arm 62 in a downward direction. The first holder arm 63 is rigid and is fixedly connected to the main arm 62. The second holder arm 64 has one end 64a that is fixedly connected to the main arm 62. The second holder arm 64 has flexibility, such that its free end 64b can be moved to a limited extent against a restoring force of the material of the second holder arm 64, as is indicated in FIG. 9 by the arrow C. By this movement the distance between the free ends 63b, 64b of the holder arms 63, 64 can be increased. In each of the holder arms 63 and 64 a recess 63c and 64c, respectively, is provided.

The application element 61 comprises a main body 61a, which extends substantially in parallel to the main arm 62 of the holder 60, and two protrusions 61b, which protrude laterally from the main body 61a. The two protrusions 61b are dimensioned such that they can be inserted in a form-locking way into the recesses 63c and 64c of the holder arms 63 and 64. The form-locking engagement brings about a torque proof connection between the application element 61 and the holder 60. In the shown embodiments the application element 61 is designed as application blade, which has a lower edge 61c that effects the application of the building material and a smoothing of the same.

As is schematically shown in FIG. 9 by the arrows C and D, the free end 64b can be moved away from the free end 63b in the direction of the arrow C, so that the form-locking engagement between the application element 61 and the second holder arm 64 is released. Then the application element 61 can be removed from the holder 60, as is indicated by the arrow D.

A mounting of the application element 61 to the holder 60 is done in the reverse order.

By the described design the application element 61 can be released from the holder 60 and mounted on the holder 60 in a tool-less way, i.e. without using a tool. Thereby a quick and efficient exchange of the application element 61 is made possible. Time can be saved during service and cleaning work and the device 1 is in less time again available for the next production process. In particular, different application elements 61 can be used for subsequent building processes depending on the respective requirements and these application elements 61 can be changed between the building processes with a small effort.

Other configurations for connecting the application element 61 with the holder 60 are possible. For instance, recesses may be provided at the application element 61 and protrusions may be provided at the holder 60 for a form-locking connection. For instance, also an insertion into a groove and optionally an engagement between the application element 61 and the holder 60 may be provided.

The drive mechanism 59 of the application system 27 is described with respect to FIG. 13. As can be seen in FIG. 13, the holder 60 of the application device 27 is connected to a drive shaft 65 in a torque proof way. The drive shaft 65 is pivot-mounted at its ends in bearings 66 and 67. The drive shaft is rotatable around an axis E that is perpendicular to the building plane 11, which is shown in FIG. 5. The rotation is indicated by the arrows F in FIG. 13. Further, a lever 68 is mounted on the drive shaft 65 in a torque proof way. The lever 68 is connected to an actuation piston-cylinder system 69. Further, the lever 68 is connected to a break piston-cylinder system 70. In the embodiment the actuation piston-cylinder system 69 is designed as pneumatic system, which drives the drive shaft 65 such that the drive shaft 65 rotates around the axis E, when the piston is charged with pressure via the lever 68. The rotation of the drive shaft 65 results in a rotation of the holder 60, so that the application element 61 is set in motion in parallel to the building plane 11. The drive shaft 65 is arranged laterally to the construction field or building field, in which the solidification of the building material is carried out, in the back region of the building space. Via the drive mechanism 59 the application device 27 can be moved on a path across a limited angular range, wherein the path corresponds to a sector of a circle. Thus, the application device 27 is moved back and forth on a circular path between a first position on one side of the construction field and a second position on the opposite side of the construction field. Due to this configuration the drive mechanism 59 for moving the application device 27 is arranged substantially on one side of the construction field and an unimpeded access to the construction field from the opposite side is ensured. By providing the pneumatic system as drive the motion of the application device can be implemented with high precision and at the same time at a low cost.

The break piston-cylinder system 70 is designed as an oil dashpot. The break piston-cylinder system 70 effects a damping of pressure variations, when the actuation piston-cylinder system is charged, or of variations of the resistive force that is countering the drive, which changes would effect an abrupt change the velocity of the application device 27. Thus, a uniform movement of the application device 27 with a predetermined velocity profile is enabled. The optimized motion of the application device 27 leads to an improved uniform application of a layer and thus to an improvement of the part quality.

In the embodiment an application device 27 is described, which moves on a circular path around the axis E in parallel to the building plane 11. The circular path is dimensioned such that the application device 27 performs a movement across the whole building plane 11. The application device can also be configured such that a linear movement across the building plane 11 is implemented. In this case the combination of the actuation piston-cylinder system 69 with the break piston-cylinder system 70 also leads to a more uniform movement of the application device and thus to an improved layer application.

Replacement Container/Suspension

The configuration of the container 25 in the embodiment is described with respect to FIGS. 5 and 10. In FIG. 5 the container 25 having the support device 26 arranged therein is only shown schematically.

In the embodiment the container 25 is designed as a replacement container or swap container, which can be taken out of the device 1 together with the support device 26, which forms a building platform and is located therein. A coupling mechanism that is not shown is provided in the device 1. By the coupling mechanism the connection of the support device 26 and the container 25 to the drive for vertically moving the support device 26 can be established and released. This coupling mechanism is driven by a control of the device 1. The coupling mechanism can be configured such that it is similar to the one that was described in the prior art mentioned in the introduction.

As is schematically shown in FIG. 10, a mounting 74 is provided at a door 73. The door 73 is swivel-mounted at the machine frame of the device 1 and in a closed state secludes the building space 10 of the device 1 from the outside of the device 1. In the embodiment the door 73 is mounted at one side such that it can be pivoted around an axis G as is indicated by the arrow H. In the shown embodiment the axis G runs vertically, so that the door 73 of the device 1 swings open to the side.

The container 25 comprises on the one side an attachment 75. The attachment 75 can be brought into an engagement with the mounting 74 in the door 73 such that the container 25 is supported at the door 73 and together with the door 73 can swing open from the machine frame. In the shown embodiment the mounting 74 is formed on the inner side of the door 73 as a protrusion that has a recess at its top side. The attachment 75 at the container 25 is designed as a protruding hook, which engages into the recess.

In order to insert the container 25 into the device 1 the attachment 75 of the container 25 is engaged with the mounting 74 with the door 73 being open. This procedure can be comfortably carried out, because the mounting 74 is easily accessible from the outside of the device 1, when the door 73 is open. The container 25 is decoupled from the mounting 74 via the coupling mechanism by means of the control of the device 1. The support device 26 is connected to the respective drive.

In this state the container 25 is not connected with the door 73 and the door 73 can be opened if necessary without taking the container 25 out of the device 1. On the other hand by the control of the device 1 the container 25 can be re-engaged with the mounting 74 and the support device 26 can be decoupled from the respective drive. In this state the container 25 can be moved out of the building space 10 and out of the device 1 by opening the door 73. The container 25 swings out together with the door 73. In this position the container 25 can be comfortably taken out of the device, wherein it is not necessary to reach into the inside of the machine.

Though in the embodiment the door 73 is swivelled around a vertical axis, it is e.g. also possible to provide a door that opens horizontally in a different way. Moreover, the connection between the door 73 and the container 25 is not limited to the described embodiment having recess and an engaging hook. Also other mechanisms can be provided that enable an engagement of the door 73 with the container 25.

Building Platform Sealing

The guide of the support device 26 in the container 25 is described with respect to FIG. 11. As was already described with respect to FIG. 5, the support device 26 can be moved in a vertical direction K relative to the container 25 via a drive. The upper side of the support device 26 forms the building platform 78, on which the three-dimensional object to be formed is generated layer-wise. Between the building platform 78 and the inside wall 79 of the container 25 there is a gap 80 that is dimensioned such that the support device 26 can be moved inside of the container 25 in a vertical direction. There is the danger that the building material gets from the region of the building platform 78 via the gap 80 into the region in the container 25 underneath the building platform 78. The passing of building material is however not desired, because a contamination of the drive may occur and as a result service work will be necessary.

In order to avoid a passing through of building material, the gap 80 is closed by a seal 81 that is described in the following. The seal 81 is formed by a layer of a flexible material, which is annularly arranged along the edge of the building platform 78 underneath the building platform 78. The seal 81 is for example made of a flat strip of a silicone material. However, also other materials, which have a sufficient temperature resistance and flexibility, are possible. In a flat state the seal 81 has an outer dimension in the plane perpendicular to the movement or shifting direction K, which is slightly larger than the inner dimension of the container 25. Thus, when it is inserted in the container 25, the seal 81 is slightly bent in the zone of the gap 80 and butts against the inside wall 79 of the container 25 with a small tension due to the flexibility of its material.

Underneath the building platform 78 a guide plate 82 is arranged under the seal 81. In a plane, which is perpendicular to the direction of movement K, the guide plate 82 has a slightly larger outer dimension than the building platform 78. The circumferential outer edge 82a of the guide plate 82 is angled towards the gap 80. The outer edge 82a butts against the seal 81 in the zone of the gap 80. The outer edge 82a bends the seal 81 in the region of its outer circumference, so that the edge of the seal 81 in the gap is angled towards an upper boundary of the space. Even when the building platform 78 is moved in a direction opposite to the bending direction of the angulated edge region of the seal 81, the guide plate 82 prevents the flexible seal 81 from folding down in its edge region opposite to its pre-shaped direction. Thus, it is ensured that the support device 26 together with the building platform 78 can be reliably shifted relative to the container 25 in the shifting direction K. Moreover, a passing of particles of the building material into the region underneath the building platform 78, which would be able to occur when the seal folds down, is prevented.

Further, the guide plate 82 having the angled edge region 82a has the effect that a plane plate made of e.g. silicone can be used as seal 81. The seal 81 can e.g. also be made from a different plastic. Based on this implementation the seal need not have at its outer edge in the circumferential direction a special structure or shaping that is adapted to the exact dimension of the inner diameter of the container.

Tempering of the Container

The lower region 41 of the building space 10 is described with respect to FIGS. 5 and 6. As can be seen in FIG. 5, a chamber 85 is formed in the lower region 41, wherein the chamber 85 surrounds the lower side of the container 25. When operating the device 1, the chamber 85 is filled with a fluid medium. In the embodiment the fluid medium is a gas. In particular, in one embodiment this gas is an inert gas, which is also used in the upper region 40 in order to prevent a deterioration of the building material by e.g. oxidation.

The chamber 85 is laterally limited by side walls 86 and at the top is separated from the upper region 40 of the building space 10 by a separating plate 87 at the height of the building plane 11. The chamber 85 is bounded below by a bottom 88. The bottom 88 comprises a passage 89 for a connection of the support device with its drive in the region below the container 25. In the bottom 88 in a region under the corners of the container 25 outlets 90 are provided. In the shown embodiment under each corner of the container 25 two outlets 90 are provided. However, also a different number of outlets may be provided, e.g. only one outlet may be provided for each corner.

Moreover, in the side walls 86 openings 91 are provided in the upper part, as can be seen in FIG. 5. The openings 91 are connected to the outlets 90 via a ventilation system. In the embodiment the ventilation system is arranged outside of the chamber 85 and is formed by a second chamber 84 outside of the side walls 86 and under the bottom 88. A ventilator 92 is located in the ventilation system. Moreover, a heating device 93 and a temperature sensor are provided in the ventilation system. By the ventilator 92 the fluid medium in the lower region 41 is sucked through the openings 91 into the second chamber 84 and a directed flow of this medium is re-introduced through the outlets 90 into the chamber 85. Due to the positioning of the outlets 90 underneath the corners of the container 25 and due to the openings 91 in the side walls 86 a directed flow is generated in the region of the corners of the container 25, which directed flow effects a temperature adjustment or balancing of the container 25. This flow is indicated by the arrows S in FIGS. 5 and 6. By this flow the temperature profile of the container 25 can be defined and a uniform tempering of the container 25 is possible. By providing the heating device 93 and the temperature sensor an exact adjustment of the temperature of this flow is possible. Thus, the temperature of the container 25 and of the building material located therein can be adjusted in a defined way during the operation of the device 1. The flow causes a heat exchange between the fluid medium and the container 25, in particular in the corners of the latter. Based on the corners the temperature profile of the container 25 can be kept particularly homogenous in an advantageous manner.

By the selective tempering of the corners of the container by means of the directed flow a controlled cooling of the solidified building material and the surrounding non-solidified building material in the container 25 can be carried out during the operation. Thus, when the building material cools down, extreme temperature gradients, which would lead to a deterioration of the manufactured three-dimensional objects by warping during the cooling down, can be prevented.

In the embodiment the same process gas that is also used in the upper region 40 of the building space 10, which is the actual building region, is used as fluid medium. Thus, a particular sealing between the upper region 40 and the lower region 41 of the building space 10 is not necessary. Thus, a cost-effective construction of the device 1 is made possible. Further, also a thermal aging of the building material in the container 25 is prevented in a higher degree. This is also particularly advantageous with respect to a recycling of the non-solidified building material in a further building process.

Building Material Supply

The supply of the building material to the device 1 is described with respect to FIGS. 1, 12 and 15. As can be seen in FIG. 1, in the backward region of the device 1 an opening 95 for feeding the building material is formed. The opening 95 is connected to the supply opening 30, which leads to the building space 10 and is shown in FIG. 5. In the device 1 in the region of the opening 95 a duct 96 is formed. Via the duct 96 the building material is supplied to the supply opening 30. In the embodiment the supply is effected based on the intrinsic weight of the building material by drop delivery. The upper region of the duct 96 is schematically shown in FIG. 12.

The duct 96 has a cover wall 97 at its top side, wherein in the cover wall two openings 97a and 97b are provided in order to be connected to filler pipes 98a and 98b for a building material supply. The filler pipes 98a and 98b have at its upper side connectors 99a, 99b for building material supply containers 100a and 100b, respectively. The connectors 99a and 99b can be separately connected to the building material supply containers 100a and 100b. In each of the filler pipes 98a, 98b a gate 101a and 101b, respectively, is provided. Each of the gates 101a, 101b can be moved into a first position, in which the cross-section of the corresponding filler pipe 98a and 98b, respectively, is closed, as it is shown on the left side in FIG. 12. The gates 101a, 101b can also be moved to a second position, in which the cross-section of filler pipe 98a and 98b, respectively, is not closed or covered and building material can pass from the building material supply container 100a und 100b, respectively, to the duct 96.

In the duct 96 below the openings 97a and 97b filling level sensors 102a and 102b, respectively, are mounted. The filling level sensor 102a detects, whether building material is in the duct 96 below the filler pipe 98a. The filling level detector 102b detects, whether there is building material in the duct below the filler pipe 98b.

Each of the filler pipes 98a and 98b is provided with a mechanism, by which it can be moved above the duct 96 and can be moved away from the duct 96, respectively, together with a building material supply container 100a and 100b, respectively, as is schematically shown in FIG. 15. Both filler pipes can be moved independently. In the embodiment this motion is a swiveling around an axis that is substantially horizontal.

In operation the duct 96 is initially filled with building material. A building material supply container 100b is also filled with building material and the corresponding gate 101 is in the open position. A column of the building material extends within the duct 96 to a position, which is higher than the respective filling level sensor 102b. The second building material supply container 100a is also filled with building material. However, the respective gate is still in the closed position, as is shown in FIG. 12.

When operating the device 1, building material is consumed and the filling level in the duct 96 falls, because the building material is supplied to the building space 10 via the supply opening 30 due to its weight. As long as there is building material in the building material supply container 100b, this building material slides along into the duct 96. When the building material supply container 100b is empty and the device 1 is further operated, the filling level in the duct 96 falls on the side of the filling level sensor 102b. Then the filling level sensor 102b detects that the building material supply container 100b is empty. Afterwards the gate 101 in the filler pipe 98b is closed. The gate 101 in the other filler pipe 98a is opened, so that building material is supplied to the duct 96 from the other building material supply container 100a.

In this position the building material supply container 100b can be removed from the device 1 and can be filled or can be replaced by another filled building material supply container. The connector 99a and 99b, respectively, can e.g. be designed as an inside thread in the filler pipe 98a and 98b, respectively, into which a corresponding outside thread at the building material supply container 100a, 100b is screwed. This enables the use of commercially available containers as building material supply containers. The filled or replaced building material supply container can again be connected with the filler pipe 98b and can be moved over the duct 96, so that it is available when the other building material supply container 100a is empty.

When the building material supply container 100a is empty, the filling level in the duct 96 falls and the filling level sensor 102a detects this falling and outputs a signal to the control of the device 1, which indicates that the building material supply container is empty. Afterwards the gate 101 in the filler pipe 98a can be closed and the gate 101 in the filler pipe 98b can be opened so that again building material from the building material supply container 100b can be supplied. The closing and opening of the gates 101 can be effected by the control of the device 1. Then the building material supply container 100a can be exchanged.

Two building material supply containers 100a and 100b are provided, which can be independently connected to the device 1 via independent connectors 99a and 99b. The operation of the device 1 need not be interrupted, when a building material supply container 100a and 100b, respectively, is replaced or exchanged. The exchange of the building material supply container can be carried with the building process being continuously performed, when a three-dimensional object is manufactured in the building space 10. An efficient operation of the device 1 is achieved and idle periods, in which there can be no building processes, can be reduced. The device 1 can be operated in a simpler way. During the operation a building material supply container can always be held in a filled state.

Further, a lid for closing the building material supply containers 100a, 100b can be provided. Then the building material supply containers may be closed before a supply to the device 1 and after an extraction.

By designing the filler pipes 98a, 98b such that they have connectors 99a, 99b for the building material supply containers 100a, 100b, it is possible to use in the device building material supply containers, which are also suited for storing and for mixing the building material. Depending on the design of the connector commercially available containers can be used.

Moreover, also a plurality of building material supply containers may be provided for e.g. different building materials or for a storage of building material. In particular, a plurality of building material supply containers can be used such that the device 1 is operated with two building material supply containers and at the same time a mixing of building material is carried out in further building material supply containers. Further, the device 1 can also be provided with one connector or with more than two connectors for the building material supply containers.

In an embodiment the control of the device 1 is configured such that the filling level information is automatically sent electronically to the operators by the filling level sensors 102*a*, 102*b*. The information can e.g. be sent via SMS or via e-mail. To this effect the device 1 has an appropriate network connection.

It was described that the supply of the building material is effected by using the intrinsic weight of the building material. However, the supply can also be effected in a different way. For instance, a mechanical device may be provided for the building material supply containers, which mechanical device assists in supplying the building material to the duct. For instance, a vibration device can be used, which induces a vibration of the building material supply containers 100*a*, 100*b* and of the building material therein, respectively, in order to assist the supply of building material to the duct 96. The vibration device can e.g. be formed by one or more mechanical vibration exciters, which are arranged at the filler pipes 98*a*, 98*b* (filler portions).

Modifications

Modifications of the described device are possible. Instead of a laser a different energy source such as another light source or e.g. also an electron source or another particle source may be used. Depending on the energy source also other optical systems may be used. In the case of an electron source as energy source e.g. an electromagnetic lens and deflection system may be used. Some of the described features such as the design of the frame system can also be implemented in e.g. devices for a 3D printing using a method similar to inkjet printing or in mask exposition methods.

Also when using a laser as energy source, the device can e.g. be configured such that it is used in a laser sintering method or such that it is used in a laser melting method, in which the building material is locally melted.

A plurality of materials can be used as building material. For instance, a plastic powder such as a polyimide powder can be used or it is also possible to use metal or ceramics powders. It is also possible to use mixtures. For instance plastic-coated metals can be used.

The invention claimed is:

1. A method comprising:
supplying building material to a device for manufacturing a three-dimensional object by a layer-wise solidification of the building material at positions in respective layers that correspond to the object,
wherein the device comprises:
a machine frame;
a building space provided in the machine frame;
a feed that supplies building material to the building space;
at least first and second filler pipes provided at the feed, the filler pipes being independent from one another; and
a connector for a building material supply container that supplies building material from outside of the device, the connector provided at each of the filler pipes; and
exchanging the building material supply container connected to the first filler pipe while the building material is supplied to the device from the building material supply container connected to the second filler pipe and while a building process is on-going in the device,
wherein operation of the device is not interrupted when the connector is detached from the building material supply container.

2. The method according to claim 1 further comprising detecting whether building material is supplied via the connector.

3. The method according to claim 1, wherein before the step of exchanging, closing the first or second filler pipe that is connected to the building material supply container by a gate in the filler pipe.

4. The method according to claim 3, further comprising first and second sensors respectively provided for the first and second filler pipes, the sensors adapted to detect whether the building material is supplied via first or second pipe and wherein the gate is activated depending on a detection result from the first and/or second sensor.

5. The method according to claim 1, wherein before the step of exchanging, moving the building material supply container from a first position, in which the building material is supplied to the feed, to a second position, in which the building material supply container is detachable from the first or second filler pipe.

6. The method according to claim 1, wherein a powder or a mixture of powders is used as building material.

7. The method according to claim 1, further comprising a vibration device for vibrating the building material and assisting the supply of the building material to the building space.

8. The method according to claim 1, wherein the feed is a duct and the supply of the building material to the building space is effected by intrinsic weight of the building material.

9. A method for manufacturing a three-dimensional object by layer-wise solidification of a building material in powder form at positions in respective layers that correspond to the object, the method comprising the following steps:
a first step of applying a layer of the building material in powder form onto a building platform or onto a previously solidified layer of the building material; and
a second step of solidifying the building material in powder form at the positions of the layer that corresponds to the object;
wherein the method is performed in a device comprising
a machine frame;
a building space provided in the machine frame;
a feed that supplies the building material to the building space;
at least first and second filler pipes provided at the feed, the filler pipes being independent from one another; and
a connector for a building material supply container that supplies the building material from outside of the device, the connector being provided at each of the first and second filler pipes; and
exchanging the building material supply container while building material is supplied to the device from the building material supply container and while a building process is on-going in the device, wherein operation of the device is not interrupted when the connector is detached from the building material supply container.

10. The method according to claim 9 further comprising detecting whether building material is supplied via the connector.

11. The method according to claim 9, wherein before the step of exchanging, closing the first or second filler pipe that is connected to the building material supply container by a gate in the filler pipe.

12. The method according to claim 11, further comprising first and second sensors respectively provided for the first and second filler pipes, the sensors adapted to detect whether the building material is supplied via first or second pipe and wherein the gate is activated depending on a detection result from the first and/or second sensor.

13. The method according to claim 9, wherein before the step of exchanging, moving the building material supply container from a first position, in which the building material is supplied to the feed, to a second position, in which the building material supply container is detachable from the first or second filler pipe.

14. The method according to claim 9, wherein a powder or a mixture of powders is used as the building material.

15. The method according to claim 9, further comprising a vibration device for vibrating the building material and assisting the supply of the building material to the building space.

16. The method according to claim 9, wherein the feed is a duct and the supply of the building material to the building space is effected by intrinsic weight of the building material.

17. A method for supplying building material to a device for manufacturing a three-dimensional object by a layer-wise solidification of the building material at positions in respective layers that correspond to the object, the method comprising:

providing the device that includes:
a machine frame;
a building space provided in the machine frame;
a feed that supplies the building material to the building space; and
at least first and second filler pipes provided at the feed, the filler pipes being independent from one another; and a connector for a first and second building material supply container, each of which are adapted to supply the building material from outside of the device at each of the first and second filler pipes; and exchanging the first building material supply container, which is connected to the first filler pipe, while building material is supplied to the device from the second building material supply container, which is connected to the second filler pipe, and while a building process is ongoing in the device, wherein the operation of the device is not interrupted when the connector is detached from the first or second building material supply container.

* * * * *